US009171339B2

(12) United States Patent
Dai et al.

(10) Patent No.: US 9,171,339 B2
(45) Date of Patent: Oct. 27, 2015

(54) BEHAVIOR CHANGE DETECTION

(75) Inventors: Jing D. Dai, White Plains, NY (US); Feng Cheng, Chappaqua, NY (US); Milind R. Naphade, Fishkill, NY (US); Sambit Sahu, Hopewell Junction, NY (US)

(73) Assignee: International Business Machines Corporation, Armonk, NY (US)

(*) Notice: Subject to any disclaimer, the term of this patent is extended or adjusted under 35 U.S.C. 154(b) by 904 days.

(21) Appl. No.: 13/288,716

(22) Filed: Nov. 3, 2011

(65) Prior Publication Data

US 2013/0116939 A1 May 9, 2013

(51) Int. Cl.
*G06F 19/00* (2011.01)
*G06Q 50/06* (2012.01)

(52) U.S. Cl.
CPC .................................... *G06Q 50/06* (2013.01)

(58) Field of Classification Search
CPC ...................................................... G06Q 50/06
USPC ..................................... 702/45, 62, 181, 188
See application file for complete search history.

(56) References Cited

U.S. PATENT DOCUMENTS

| | | | | |
|---|---|---|---|---|
| 5,897,612 | A | 4/1999 | Schwengler et al. | |
| 6,424,929 | B1 * | 7/2002 | Dawes | 702/179 |
| 6,643,629 | B2 * | 11/2003 | Ramaswamy et al. | 706/45 |
| 6,816,811 | B2 | 11/2004 | Seem | |
| 6,862,540 | B1 * | 3/2005 | Welch et al. | 702/44 |
| 6,920,450 | B2 | 7/2005 | Aono et al. | |
| 7,272,612 | B2 | 9/2007 | Birdwell et al. | |
| 7,395,250 | B1 | 7/2008 | Aggarwal et al. | |
| 7,668,843 | B2 | 2/2010 | Ertoz et al. | |
| 8,589,112 | B2 * | 11/2013 | Tsypin et al. | 702/130 |
| 2001/0004726 | A1 * | 6/2001 | Lambrecht | 702/5 |
| 2003/0101009 | A1 * | 5/2003 | Seem | 702/61 |
| 2010/0010985 | A1 | 1/2010 | Wong et al. | |
| 2013/0016106 | A1 * | 1/2013 | Yip et al. | 345/440 |

FOREIGN PATENT DOCUMENTS

WO 0227616 A1 4/2002

OTHER PUBLICATIONS

Neill et al., "Rapid Detection of Significant spatial Clusters", Proc. ACM SIGKDD, 2004, p. 256-265.
He et al., "Discovering Cluster Based Local Outliers", Department of Computer Science and Engineering, Harbin Institute of Technology, 2003—Elsevier.
Rocke et al., "A Synthesis of Outlier Detection and Cluster Identification", Center for Image Processing and Integrated Computing, Sep. 2, 1999, p. 1-23, Davis, CA.

* cited by examiner

*Primary Examiner* — Sujoy Kundu
*Assistant Examiner* — Ricky Ngon
(74) *Attorney, Agent, or Firm* — Cantor Colburn LLP; Janice Kwon

(57) ABSTRACT

A computer program product includes a tangible storage medium readable by a processing circuit and on which instructions are stored for execution by the processing circuit for performing a method. The method includes, upon receiving utility consumption data of a group of elements, defining clusters of elements by like geography and like utility consumption, evaluating a significance of each cluster by comparing an average utility consumption within the cluster with utility consumption of elements neighboring the cluster and determining from a result of the evaluating which clusters exhibit significant differences in utility consumption from the neighboring elements and defining those clusters as regional outliers.

21 Claims, 3 Drawing Sheets

BEHAVIOR CHANGE DETECTION

BACKGROUND

The present invention relates to behavior change detection and, more particularly, to a method for regional human behavior change detection from utility consumption.

Regional human behavior change refers to scenarios in which people in a certain area exhibit significant behavior deviation from their neighbors and their own past. This regional pattern provides important information for urban planning, public security, disease control and sales marketing. Data reflective of regional human behavior change usually reveals underlying changes of living environment, such as regional development, immigration and/or disease breakout and may uncover demographic information from special events such as, for example, start/end of school, holidays or religious holidays. Statistically significant behavior changes exhibit both temporal and spatial characteristics.

Using utility consumption to identify regional behavior change provides for a solution toward analyzing human behavior based on widely, if not publicly, available information. Because of the recent quick development of smart meter infrastructures, this solution becomes possible. However, existing statistic approaches for regional outlier detection do not consider multiple distributions of data, which may lead to failed detection of multiple local outlier regions. In addition, these approaches generally do not provide data-driven scan windows or scalable data access for large data sets.

SUMMARY

According to an aspect of the present invention, a computer program product is provided and includes a tangible storage medium readable by a processing circuit and on which instructions are stored for execution by the processing circuit for performing a method. The method includes, upon receiving utility consumption data of a group of elements, defining clusters of elements by like geography and like utility consumption, evaluating a significance of each cluster by comparing an average utility consumption within the cluster with utility consumption of elements neighboring the cluster and determining from a result of the evaluating which clusters exhibit significant differences in utility consumption from the neighboring elements and defining those clusters as regional outliers.

According to another aspect of the present invention, a method is provided. The method includes, upon receiving utility consumption data of a group of elements, defining clusters of elements by like geography and like utility consumption, evaluating a significance of each cluster by comparing an average utility consumption within the cluster with utility consumption of elements neighboring the cluster and determining from a result of the evaluating which clusters exhibit significant differences in utility consumption from the neighboring elements and defining those clusters as regional outliers.

According to yet another aspect of the present invention, a system is provided. The system includes a processing circuit configured to perform a method. The method includes, upon receiving utility consumption data of a group of elements, defining clusters of elements by like geography and like utility consumption, evaluating a significance of each cluster by comparing an average utility consumption within the cluster with utility consumption of elements neighboring the cluster and determining from a result of the evaluating which clusters exhibit significant differences in utility consumption from the neighboring elements and defining those clusters as regional outliers.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

A method for regional human behavior change detection from utility consumption is provided. The method handles residential utility consumption as a collection of time-series data and applies statistics and clustering techniques to identify multiple outlier regions. The identified outlier regions represent regional human behavior changes, which can lead to discovery of living environment changes. The method further provides for the generation of local spatial scan statistics to identify regional behavior change and incremental local spatial scan algorithms are designed and provided to ease the burden of an exhaustive search. To accelerate the local search, the method modifies a spatial index to provide for data-driven clusters and scalable data access. Using data-driven partitioning techniques, the method also provides an efficient and exact approach to compute local spatial scans. In addition, the method provides an approximate solution to further reduce computational complexity.

Figure 1:
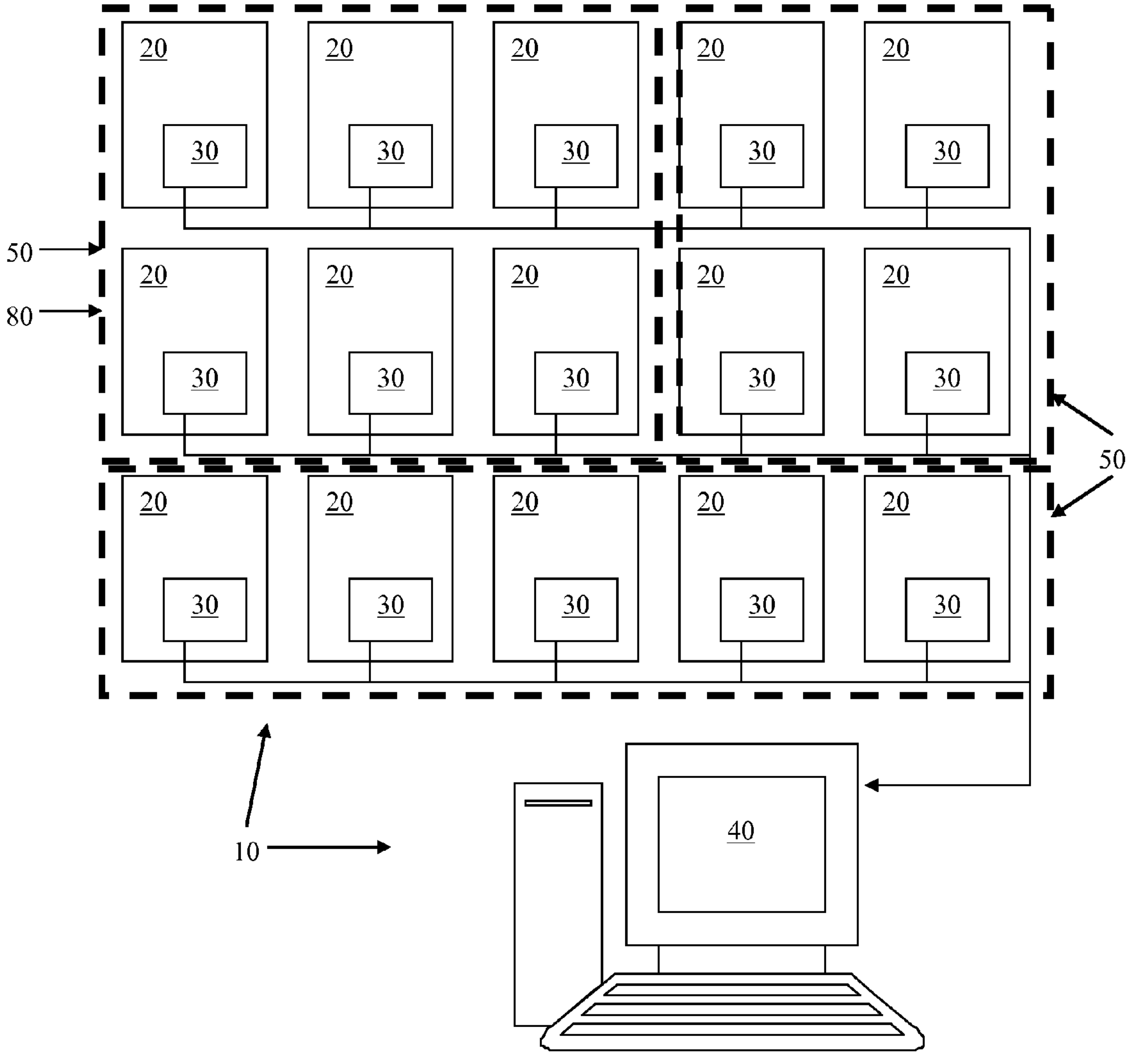
FIG. 1 is a schematic illustration of geographic and utility consumption clusters.

With reference to FIG. 1, a schematic illustration of a system 10 of geographic and utility consumption clusters is provided. As shown in FIG. 1, the system 10 includes a group of elements 20, which may be residential units such as houses and/or condominiums, commercial units such as office buildings, community units such as schools, and/or mixed use units that can have residential, commercial and/or public use. Each element 20 includes one or more utility consumption meters 30 that monitors utility consumption of that element 20 during a predefined period of time.

The utility consumption monitored by the utility consumption meters 30 may relate to at least one or more of electricity, gas, sewage, telephone, bandwidth and/or water usage of the corresponding element 20. Each consumption meter 30 need not monitor each example provided herein and the time periods of the monitoring need not be uniform. For purposes of clarity and brevity, however, the description provided below will relate to the case where each element 20 includes a single utility consumption meter 30 and where each utility consumption meter 30 monitors electricity usage in the corresponding element 20.

Each of the utility consumption meters 30 is operably coupled to a computing device 40, such as a server and/or a personal computer, such that data generated by the utility consumption meters 30 is transmittable to the computing device 40. This data may include utility consumption data for each element 20 and is reflective of the utility consumption of each element 20.

Figure 2:
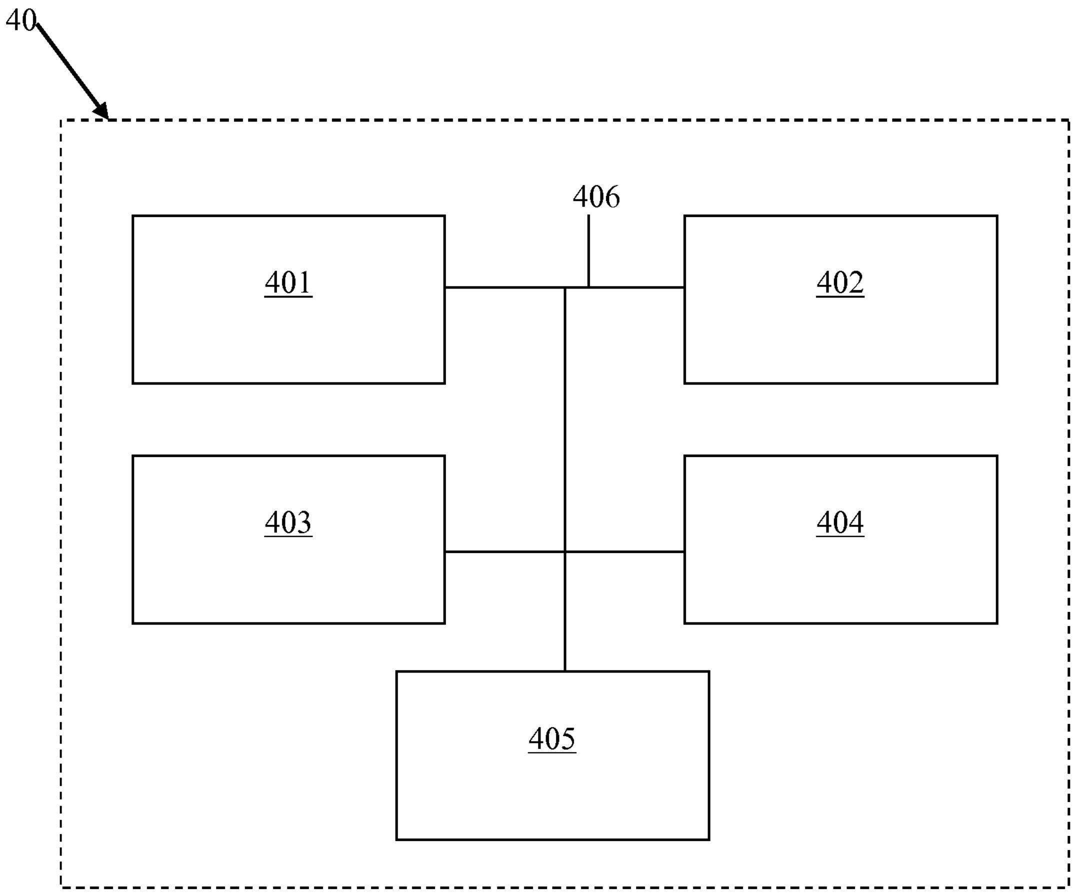
FIG. 2 is a schematic illustration of a computing system configured to execute a method for regional human behavior change detection from utility consumption.

As illustrated in FIG. 2, the computing device 40 may include a networking unit 401, which is disposed is communication with the utility consumption meters 30, a display driver 402, which drives a display unit coupled to the computing device 40, a user interface adapter 403, which controls an operation of user interface devices of the computing device 40, such as a keyboard and a mouse, a processing circuit 404 and a memory unit 405. The networking unit 401, the display driver 402, the user interface adapter 403, the processing circuit 404 and the memory unit 405 are coupled to one another by way of a bus 406. The memory unit 405 includes a tangible storage medium that is readable via the bus 406 by the processing circuit 404. Executable instructions are stored on this tangible storage medium for execution thereof by the processing circuit 404 for performing a method as described below.

Figure 3:
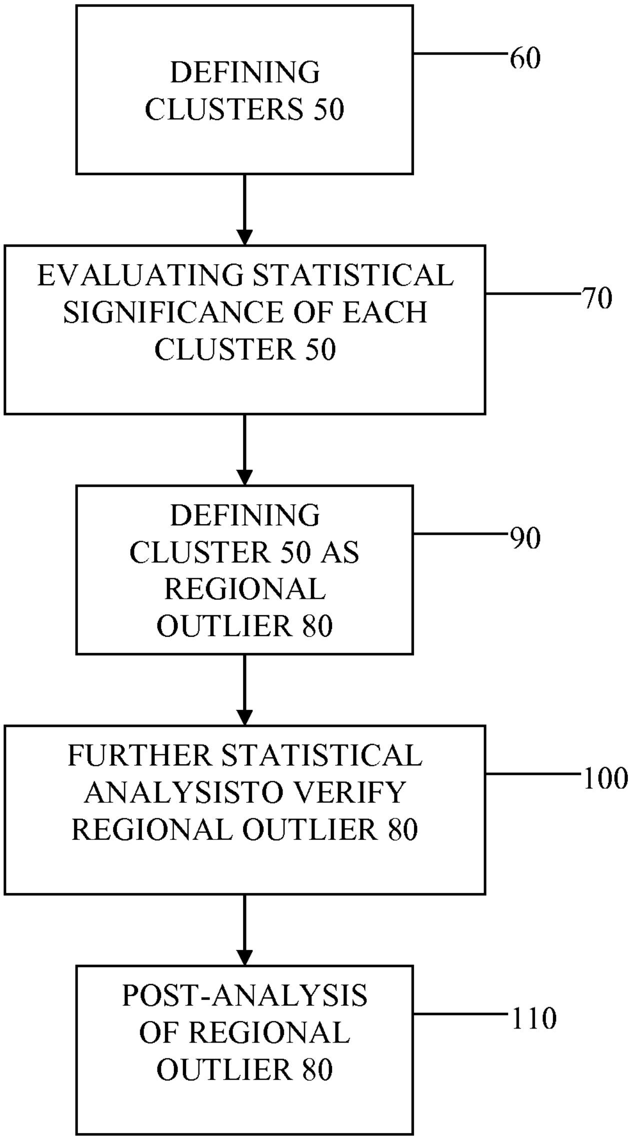
FIG. 3 is a flow diagram illustrating a method for regional human behavior change detection from utility consumption.

With reference to FIGS. 1 and 3 and, in accordance with embodiments of the invention, the method initially includes, upon receiving the utility consumption data of the group of the elements 20 from the corresponding utility consumption meters 30, defining at least one or more clusters 50 of elements by like geography and like utility consumption (operation 60). Thus, as shown in FIG. 1, the method seeks to identify a sub-group of the elements 20 as being in relatively close proximity to one another and as having relatively similar utility consumption as one another. To this end, the method further includes setting constraints upon the geographic and utility consumption limitations so that a given number of elements 20 are provided in the cluster 50. If, however, these constraints are overly limiting (or too broad), the scope of the constraints can be increased or narrowed as necessary. The change in scope may occur following the defining of operation 60 or following the operations described below.

Once the one or more clusters 50 are defined, the method further includes evaluating a statistical significance of each cluster 50 (operation 70) and determining, from a result of the evaluating, which clusters 50 exhibit significant differences in utility consumption from the neighboring elements 20 and defining those clusters 50 as regional outliers 80 (operation 90). The evaluating for each cluster 50 is conducted by comparing an average utility consumption for each element 20 within the cluster 50 with utility consumption of elements 20 that neighbor the cluster 50. Previously, such evaluating involved the analysis of global spatial scan statistics in which an input is:

$$\{(x_1, s_1), \ldots, (x_N, s_N)\},$$

where $s_i$ refers to a spatial location and $x_i$ refers to a nonspatial attribute of the location $s_i$. In this case, the original log likelihood ratio of the global scan statistic is:

$$\frac{\ln L_z}{\ln L_0} = \left(N\ln\sigma - N\ln\sigma_z + \sum_i \frac{(x_i-\mu)^2}{2\sigma^2} - \frac{N}{2}\right),$$

where σ refers to the global standard deviation of all the observations and $\sigma_z$ is the standard deviation of the observations in the scan window Z.

Embodiments of the present invention extend this analysis toward local spatial scan statistics where a local region likelihood ratio is:

$$\frac{\ln L_z}{\ln L_0} = \left((k+N_t)\ln\sigma_k - (k+N_t)\ln\sigma_t + \sum_{i\in Window_t} \frac{(x_i-\mu_k)^2}{2\sigma_k^2} - \frac{(k+N_t)}{2}\right),$$

where $\sigma_k$ refers to a variance of a union of k numbers of cluster 50 neighbors and the elements 20 within the cluster 50 and $N_t$ refers to a number of observations in the cluster 50. Because the component:

$$\left(\frac{(k+N_t)}{2}\right)$$

does not dependent on the scan window, and the components:

$$(k+N_t)\ln\sigma_k-(k+N_t)\ln\sigma_t$$

usually denominate the likelihood ratio score, for the purpose of efficiency, the local region likelihood ratio score is approximated as:

$$\frac{\ln L_z}{\ln L_0} = (k+N_t)\ln\sigma_k - (k+N_t)\ln\sigma_t.$$

Here, the ratio of $\ln L_z/\ln L_0$ is the cluster 50 score between 0 and 1, k is the number of neighbors of the cluster 50, $N_t$ is the number of elements 20 within the cluster 50, $\sigma_t$ is the variance of all the elements 20 within the cluster 50 and the elements 20 neighboring the cluster 50 and $\sigma_k$ is the variance of the elements 20 within the cluster 50. As such, if the cluster 50 score for a given cluster 50 is relatively high and/or close to 1, as compared with the other clusters 50, the given cluster is identified as a potential regional outlier 80.

Once the potential or candidate regional outliers 80 are identified, the method further may also include conducting a further statistical analysis (operation 100) to verify a probability of an occurrence of each of the regional outliers 80. To do so, the method may include execution of, for example, the Monte Carlo test in which the utility consumption data are re-distributed at random among the elements 20 several times (100s-1000s or more iterations) with the operations discussed above repeated for each iteration. The method also includes establishing a probability threshold for the verifying of operation 100 such as, for example, 5%. Thus, if the verifying indicates that the identified regional outliers 80 are at least 5% likely to occur, the identification is deemed to be correct. If, however, the likelihood is less than 5%, the geographic/utility consumption constraints may be deemed to be in need of revision or the identification of the regional outliers 80 may be deemed to be a statistical anomaly.

Once the regional outliers 80 are identified and verified, the method may include post-identification analysis of the regional outliers 80 (operation 110) and/or inferring behavioral changes of the regional outliers 80 relative to known environmental and/or temporal data. In accordance with embodiments, after the identification of the regional outliers 80, analyses of the regional outliers 80 can be conducted based on their background information to ascertain a potential cause of the regional outlier. This background information may include, for example, changes known to have occurred, environmental incidences and/or social events.

Technical effects and benefits of the present invention include providing a method in which, upon receiving utility consumption data of a group of elements, clusters of elements are defined by like geography and like utility consumption and a significance of each cluster is evaluated by comparing an average utility consumption within the cluster with utility consumption of elements neighboring the cluster. In addition, it can be determined, from a result of the evaluating, which clusters exhibit significant differences in utility consumption from the neighboring elements and defining those clusters as regional outliers.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a “circuit,” “module” or “system.” Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the “C” programming language or similar programming languages. The program code may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product comprising a non-transitory computer readable medium containing computer instructions stored therein for causing a computer processor to perform steps of:

upon transmissively receiving utility consumption data of a group of residential or commercial units via a networking unit, each of which includes a utility consumption meter disposed in communication with the networking unit, from the respective utility consumption meters, defining clusters of elements by geography and utility consumption;

evaluating a significance of each cluster by comparing an average utility consumption within the cluster based on the utility consumption data transmissively received via the networking units from utility consumption meters associated with the cluster with utility consumption of residential or commercial units neighboring the cluster based on the utility consumption data transmissively received via the networking units from utility consumption meters associated with the the residential or commercial units neighboring the cluster; and determining from a result of the evaluating which clusters exhibit significant differences in utility consumption from the neighboring elements by:

deriving, for each cluster, a cluster score equal to a sum of a number of neighbors of the cluster and a number of the residential or commercial units within the cluster times a natural log of a first variance minus the sum times a natural log of a second variance, and defining those clusters having cluster scores closest to 1 as regional outliers, wherein:

the first variance is a variance of the residential or commercial units within the cluster, and the second variance is a variance of the residential or commercial units within the cluster and a variance of residential or commercial units within clusters neighboring the cluster.

2. The computer program product according to claim 1, further comprising expanding or narrowing respective scopes of the geography and the utility consumption.

3. The computer program product according to claim 1, wherein the utility consumption relates to at least one or more of electricity, gas, sewage, telephone, bandwidth and water usage.

4. The computer program product according to claim 1, further comprising verifying a probability of an occurrence of the regional outliers.

5. The computer program product according to claim 4, further comprising establishing a probability threshold for the verifying.

6. The computer program product according to claim 1, further comprising analyzing the utility consumption of the regional outliers.

7. The computer program product according to claim 1, further comprising inferring behavioral changes of the regional outliers.

8. A method, comprising:

upon transmissively receiving utility consumption data of a group of residential or commercial units via a networking unit, each of which includes a utility consumption meter disposed in communication with the networking unit, from the respective utility consumption meters, defining clusters of elements by geography and utility consumption;

evaluating a significance of each cluster by comparing, with a computing device, an average utility consumption within the cluster based on the utility consumption data transmissively received via the networking units from utility consumption meters associated with the cluster with utility consumption of residential or commercial units neighboring the cluster based on the utility consumption data transmissively received via the networking units from utility consumption meters associated with the the residential or commercial units neighboring the cluster; and determining from a result of the evaluating which clusters exhibit significant differences in utility consumption from the neighboring elements by:

deriving, for each cluster, a cluster score equal to a sum of a number of neighbors of the cluster and a number of the residential or commercial units within the cluster times a natural log of a first variance minus the sum times a natural log of a second variance, and defining those clusters having cluster scores closest to 1 as regional outliers, wherein:

the first variance is a variance of the residential or commercial units within the cluster, and the second variance is a variance of the residential or commercial units within the cluster and a variance of residential or commercial units within clusters neighboring the cluster.

9. The method according to claim 8, further comprising expanding or narrowing respective scopes of the geography and the utility consumption.

10. The method according to claim 8, wherein the utility consumption relates to at least one or more of electricity, gas, sewage, telephone, bandwidth and water usage.

11. The method according to claim 8, further comprising verifying a probability of an occurrence of the regional outliers.

12. The method according to claim 11, further comprising establishing a probability threshold for the verifying.

13. The method according to claim 8, further comprising analyzing the utility consumption of the regional outliers.

14. The method according to claim 8, further comprising inferring behavioral changes of the regional outliers.

15. A system comprising a processing circuit configured to perform a method, the method comprising:

upon transmissively receiving utility consumption data of a group of residential or commercial units via a networking unit, each of which includes a utility consumption meter disposed in communication with the networking unit, from the respective utility consumption meters, defining clusters of elements by geography and utility consumption;

evaluating a significance of each cluster by comparing an average utility consumption within the cluster based on the utility consumption data transmissively received via the networking units from utility consumption meters associated with the cluster with utility consumption of residential or commercial units neighboring the cluster based on the utility consumption data transmissively received via the networking units from utility consumption meters associated with the the residential or commercial units neighboring the cluster; and determining from a result of the evaluating which clusters exhibit significant differences in utility consumption from the neighboring elements by:

deriving, for each cluster, a cluster score equal to a sum of a number of neighbors of the cluster and a number of the residential or commercial units within the cluster times a natural log of a first variance minus the sum times a natural log of a second variance, and defining those clusters having cluster scores closest to 1 as regional outliers, wherein:

the first variance is a variance of the residential or commercial units within the cluster, and the second variance is a variance of the residential or commercial units within the cluster and a variance of residential or commercial units within clusters neighboring the cluster.

16. The system according to claim 15, wherein the method further comprises expanding or narrowing respective scopes of the geography and the utility consumption.

17. The system according to claim 15, wherein the utility consumption relates to at least one or more of electricity, gas, sewage, telephone, bandwidth and water usage.

18. The system according to claim 15, wherein the method further comprises verifying a probability of an occurrence of the regional outliers.

19. The system according to claim 18, wherein the method further comprises establishing a probability threshold for the verifying.

20. The system according to claim 15, wherein the method further comprises analyzing the utility consumption of the regional outliers.

21. The system according to claim 15, wherein the method further comprises inferring behavioral changes of the regional outliers.

* * * * *